(12) United States Patent
Stanley et al.

(10) Patent No.: US 8,393,802 B2
(45) Date of Patent: Mar. 12, 2013

(54) CLEANABLE AND SELF-CLEANING FIBER OPTIC CONNECTOR

(75) Inventors: Craig Stanley, Santa Clara, CA (US); Albert John Golko, Saratoga, CA (US); Felix J. Alvarez Rivera, San Jose, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 12/895,565

(22) Filed: Sep. 30, 2010

(65) Prior Publication Data

US 2012/0082417 A1   Apr. 5, 2012

(51) Int. Cl.
*G02B 6/38* (2006.01)
(52) U.S. Cl. .............. 385/74; 385/33; 385/134
(58) Field of Classification Search .......... None
See application file for complete search history.

(56) References Cited

U.S. PATENT DOCUMENTS

| 7,325,975 B2* | 2/2008 | Yamada et al. ............ 385/54 |
| 2005/0226587 A1* | 10/2005 | Minota et al. ............ 385/134 |
| 2007/0183707 A1* | 8/2007 | Umezawa ............ 385/14 |

* cited by examiner

*Primary Examiner* — Hemang Sanghavi
(74) *Attorney, Agent, or Firm* — Kilpatrick Townsend & Stockton LLP

(57) ABSTRACT

An optical connector having a body with an outer surface, a first cavity extending within the body from the outer surface and a second cavity spaced apart from the first cavity and extending within the body of the connector from the outer surface. An optical component is positioned within the first cavity and an ejector, which extents into the second cavity, is coupled to the optical component. A biasing mechanism is operatively coupled to apply a biasing force to the ejector to secure the optical component within the first cavity. When a force greater than the biasing force is applied to the ejector within the second cavity, the ejector ejects the optical component from the first cavity so that it extends beyond the outer surface.

20 Claims, 4 Drawing Sheets

CLEANABLE AND SELF-CLEANING FIBER OPTIC CONNECTOR

BACKGROUND OF THE INVENTION

The present invention relates generally to connectors used to transmit optical signals. More specifically, embodiments of the invention pertain to optical connectors that protect optical components of the connector from scratches and other damage. Embodiments of the invention also pertain to electronic devices that include or couple to such optical connectors.

A number of different types of optical fiber connectors have been developed. For example, FIG. 1 is simplified plan view of a Toslink optical connector 2 that is often used in consumer audio equipment to carry a digital audio stream from components such as CD and DVD players to an audio video (AV) receiver that can decode the stream and output it through a set of loud speakers. Connector 2 includes a lens 4 that protrudes from an end of the connector. An optical fiber (not shown) runs through the connector from a cable 6 and terminates at lens 4. Connector 2 can be coupled to a female receptacle in the AV receiver or other component to enable connection of the fiber within cable 6 to an optical fiber within the AV receiver or other component. When mated, the two connectors align the cores of their respective fibers so that light (and thus the optical signal streams) can pass from the optical fiber in the connector through lens 4 and to the optical fiber in the AV receiver or component.

As shown in FIG. 2, lens 4 protrudes from the end of connector 2. The protruding lens is susceptible to being broken or scratched which may result in an undesirable loss of signal. Other optical connector designs place the lens flush with the end of the connector. Such an arrangement also leaves the lens exposed and susceptible to being scratched or broken.

In view of the above described deficiencies, new and improved optical connector designs are desirable.

BRIEF SUMMARY OF THE INVENTION

Embodiments of the invention pertain to optical plug and receptacle connectors that protect the optical components of the connector, such as a lens or an optical fiber, from being scratched or being otherwise damaged. The optical component can be recessed within a cavity of the connector so that it generally not exposed to potential damaging events and operatively coupled to a lever that enables the lens to be pushed out of the cavity so that it can be readily cleaned of dirt and debris.

In one particular embodiment, an optical connector having a body with an outer surface, a cavity extending within the body from the outer surface and an optical component positioned within the cavity is provided. An ejector is coupled to the optical component and a biasing mechanism is operatively coupled to apply a biasing force to the ejector to secure the optical component within the cavity. When a force greater than the biasing force is applied to the ejector, the ejector ejects the optical component from the cavity so that it extends beyond the outer surface. The process of ejecting the optical component from the cavity can remove dirt and debris accumulated in the cavity and allows the optical component to be further cleaned. In various embodiments the optical component is a lens and/or an optical fiber.

In another embodiment, an optical jack is provided that includes a body having a front external surface and first and second cavities extending from the first surface into the body. An optical component is positioned within the first cavity. The jack further includes a lever having a first end coupled to the optical component, a second end extending into the second cavity and a pivot point between the first and second ends. The lever is biased to secure the optical component within the first cavity. When a force is applied to the second end of the lever to overcome the bias, the lever extends a portion of the optical component out of the cavity beyond the front surface of the body. The process of ejecting the optical component from the cavity can remove dirt and debris that collected in the cavity and allows the optical component to be further cleaned. In various embodiments the optical component is a lens and/ or an optical fiber.

To better understand the nature and advantages of the present invention, reference should be made to the following description and the accompanying figures. It is to be understood, however, that each of the figures is provided for the purpose of illustration only and is not intended as a definition of the limits of the scope of the present invention.

DETAILED DESCRIPTION OF THE INVENTION

Figure 1:
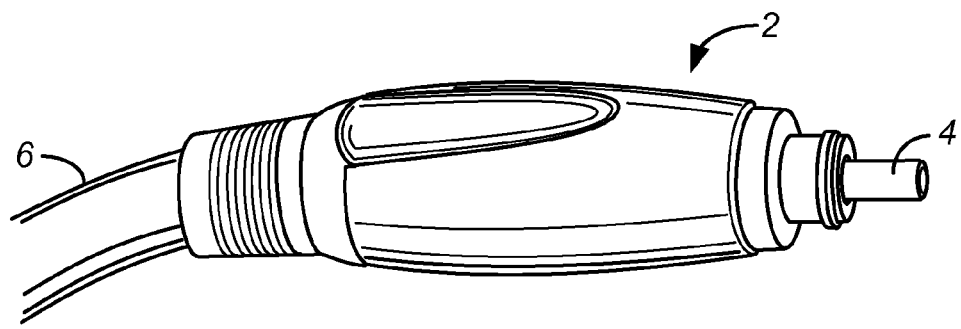
FIG. 1 is a simplified side view of a previously known Toslink optical connector.
Figure 2:
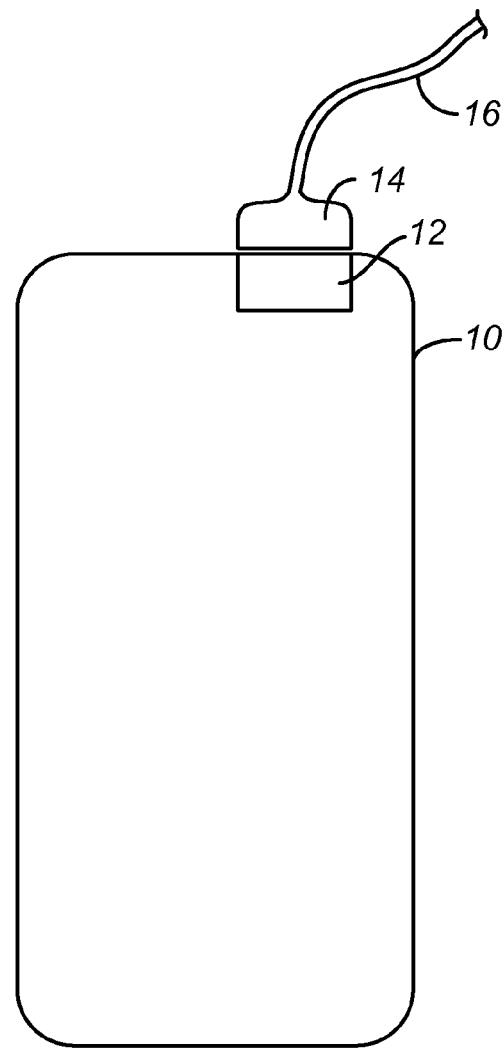
FIG. 2 is a simplified block diagram of an electronic device 10 and an optical connector system 12, 14 according to an embodiment of the present invention.

FIG. 2 is a simplified block diagram of an electronic device 10 and an optical connector system according to one embodiment of the present invention. Electronic device 10 includes an optical receptacle connector or jack 12. Electronic device can be any electronic device that transmits and/or receives optical signals. Examples of suitable devices include handheld media players, cell phones and smart phones, portable or desktop computers or audio video components such as CD players, DVD players, Blue-Ray players, digital video records, AV receivers and the like.

As shown in FIG. 2, optical receptacle connector 12 can be coupled to an optical plug connector 14 to transmit optical signals between electronic device 10 and another device over a fiber optic cable 16. Each of connectors 12 and 14 include an optical fiber (not shown) that transmits streams of optical signals. When the connectors are mated together, the cores of their respective fibers are aligned so that the optical signal streams can pass from connector 12 to connector 14 and vice-versa.

Embodiments of the invention provide improved optical jack and/or plug connectors 12 and 14, respectively, that protect optical components of the connector from being scratched or being otherwise damaged in order to reduce the chances of signal loss. In some embodiments an optical component (e.g., lens or optical fiber) of the connector can be recessed within a cavity of the connector so that it is not readily exposed to potential damage if the connector comes into contact with an object that could scratch or otherwise damage the connector. Dirt and debris may collect in such a cavity. Embodiments of the invention operatively couple the optical component to a lever or other type of ejector that enables the component to be pushed out of the cavity so that it can be readily cleaned of any such dirt and debris.

Figure 3A:
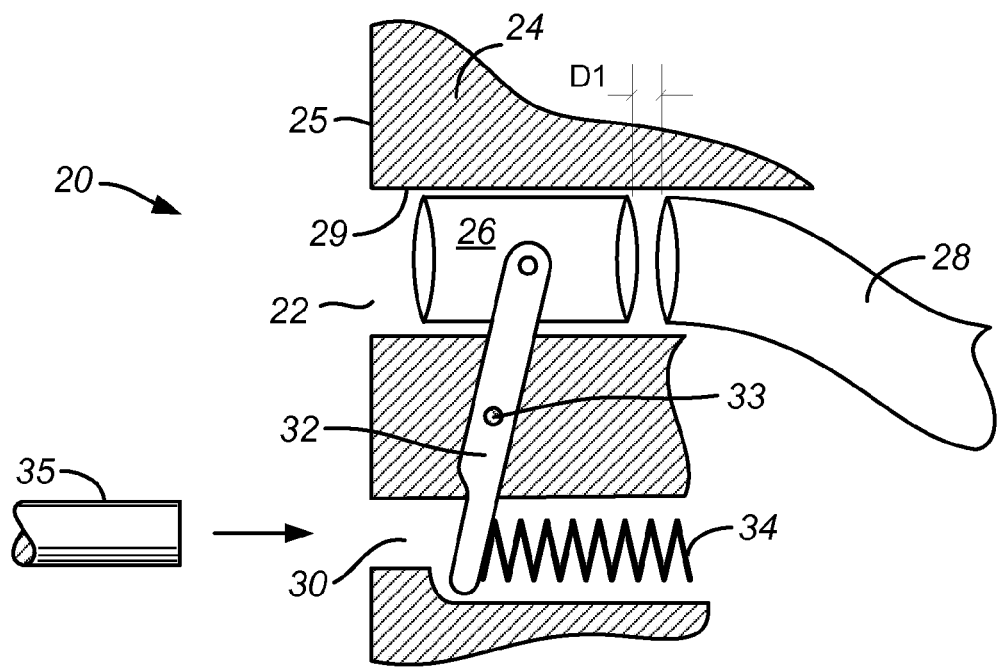
FIG. 3A is a simplified cross-sectional view of a portion of an optical connector 20 according to one embodiment of the invention.
Figure 3B:
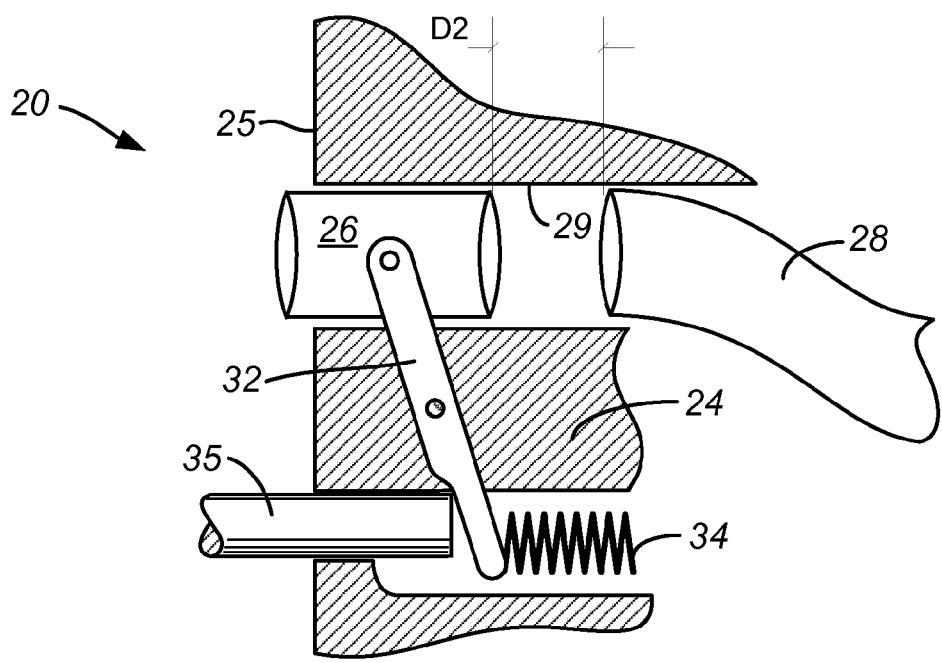
FIG. 3B is a simplified cross-sectional view of optical connector 20 shown in FIG. 3A in which its lens 26 is in an ejected position.

In order to better appreciate and understand the present invention, reference is first made to FIGS. 3A and 3B which are simplified cross-sectional views of a portion of an optical connector jack 20 according to one embodiment of the invention, which can be incorporated into electronic device 10 as connector jack 12. Jack 20 includes a lens cavity 22 formed in a body 24 having an exterior surface 25. Body 24 may be assembled within electronic device 10 such that exterior surface 25 is flush with an exterior surface 18 of the electronic device while the remainder of body 24 is embedded within the electronic device and thus not visible unless device 10 is disassembled.

Lens cavity 22 may be a cylindrical cavity or bore in which a lens 26 and an end of an optical fiber 28 are housed. In other embodiments, cavity 22 has a square, rectangular or other cross-sectional shape. In some embodiments, cavity 22 has a cross-section sized to closely match the cross-section of lens 26 so that there is minimal space between lens 26 and the interior sidewall surface of cavity 22. Lens 26 can be made from a hard material to reduce abrasions or scratches and increase the useful lifetime of connector 20. In some embodiments, lens 26 is made from hardened glass (e.g., aluminosilicate glass), sapphire, clear ceramics, spinel (e.g., magnesium aluminum oxide) or aluminum oxynitride (e.g., ALON™)

Lens 26 is optically coupled to fiber 28 to transmit optical signals between the lens and fiber. In some embodiments, fiber 28 is physically coupled to lens 26. In other embodiments, and as shown in FIG. 3A, fiber 28 is spaced apart from the end of lens 26 by a distance, D1, that is sufficiently short to allow optical signals to be transmitted between fiber 28 and lens 26. As a person of skill in the art will appreciate, distance D1 is dependent on the transmission power of the optical signal stream. Higher power levels allow a larger gap between the lens and the end of the fiber. In some embodiments, D1 is less than one centimeter. The embodiment shown in FIG. 3A improves signal transmission between lens 26 and fiber 28 by coating interior surface 29 of lens cavity 22 with a reflective coating. While not shown in FIG. 3A, the end of fiber 28 may include a ferrule and be polished smoother to improve the integrity and optical qualities of the fiber. The ferrule may be made out of metal or may be made out of a glass or a ceramic or other material.

Connector jack 20 also includes a second cavity 30 into which a first end 32a of a lever 32 or other type of ejector extends. In the embodiment shown in FIGS. 3A and 3B, lever 32 is operatively coupled at or near its second end 32b to lens 26 and biased by a spring 34 (or other suitable mechanism) to retract lens 26 within lens cavity 22 so that the lens is positioned a minimum distance (e.g., 2-10 mm) from exterior surface 25. In other embodiments, instead of being coupled to lens 26, lever 32 may be coupled to a different optical component, such as fiber 28 or a ferrule or one or more lenses of a multi-lens optical system.

When a tool 35 is extended into cavity 30 to overcome the bias of spring 34, lever 32 pivots around a fulcrum point 33 to extend lens 26 out of cavity 22 as shown in FIG. 3B. The act of ejecting the lens from cavity 22 pushes dirt and other debris that may have collected within the cavity out. Additionally, any additional dirt or debris that collects on the surface of lens 26 can be removed, for example with a soft brush or a finger tip, to prevent degradation of optical signals transmitted through the lens. In this manner, cavity 22 and lens 26 can be easily be kept clean. Generally, tool 35 and cavity 30 have similar cross-sections (e.g., both may have circular cross-sections or both may have square or rectangular cross-section) so that the tool fits readily into the cavity but this is not necessary for all embodiments.

While not shown in FIG. 3A or 3B, connector jack 20 can include one or more active optical components coupled to fiber 28 that convert optical signals received through lens 26 to electric signals that can be processed by electronic device 10 and that convert electric signals generated by electronic device 10 to optic signals that can be transmitted through lens 26 and connector jack 20 to an optical fiber in a corresponding plug connector. Also, as will be understood by a person of skill in the art, connector jack 20 can be mated with a corresponding plug connector so that a fiber with the plug connector aligns with lens 26 to transmit optical signals between the plug connector and fiber 28. The plug connector can be designed so that it mates with jack 20 when lens 26 is in a recessed position as shown in FIG. 3A. Alternatively, the plug connector can be designed to include an integrated tool 35 and mate with jack 20 when lens 26 is in an ejected position as shown in FIG. 3B in which case the distance D2 between lens 26 and fiber 28 should be sufficiently small to allow transmission of the optical signal stream between the two components. A variety of different alignment and coupling mechanisms can be used to mate connector jack 20 to the plug connector and such have not been shown in either of FIG. 3A or 3B for ease of illustration.

Figure 4:
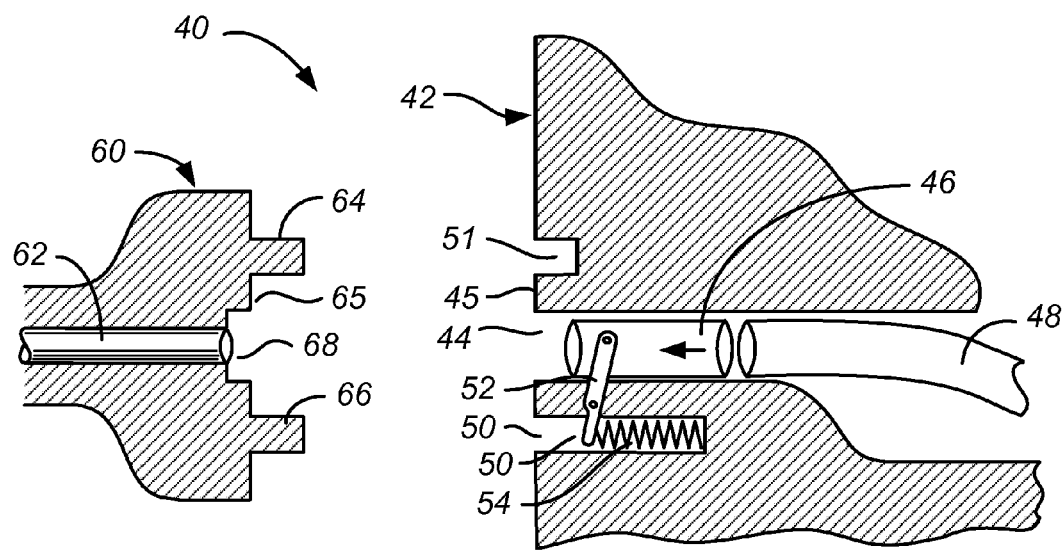
FIG. 4 is a simplified cross-sectional view of a portion of an optical connector system 40 according to another embodiment of the invention.

FIG. 4 is a simplified cross-sectional view of a portion of an optical connector system 40 according to another embodiment of the invention having a connector jack 42 and a plug connector 60. Connector jack 42 includes a cylindrical lens cavity 44 in which a lens 46 and optical fiber 48 are positioned. Jack 42 also includes a second cavity 50 which, along with a cavity 51, facilitates alignment of corresponding plug connector 60. A first end of a lever 52 and a spring 54 are situated within cavity 50 in a manner similar to that of lever 32 and spring 34 discussed above with respect to connector jack 20 and FIGS. 3A and 3B.

Plug connector 60 includes an optical fiber 62 that terminates in a cavity 68 positioned between alignment projections 64, 66. Fiber 62 may be polished at its end to improve its optical properties and may also include a ferrule at its end and/or an appropriate lens. Projections 64, 66 align with and are inserted into cavities 50, 51 of jack 40 when plug connector 60 is mated with jack connector 42. During a mating event, surfaces 45 and 65 of the connectors may contact each other and projection 66 activates lever 52 to extend lens 46 out of lens cavity 44 towards fiber 62 and into cavity 68. When the connectors are operatively coupled, lens 46 and fiber 62 are aligned to allow for the transmission of optical signals there between.

While not shown in FIG. 4, some embodiments of the invention include a mechanical latch or similar mechanism to secure connectors 42 and 60 together once they are mated. For example, in one embodiment, projections 64 and 66 may include notches on the sides of the projections near their distal ends that align with retention mechanisms such as cantilevered springs or detents within cavities 50 and 51. When the detents and notches can be positioned so that they engage once the connectors are fully mated and provide a force that is sufficient to overcome the force applied by spring 54 that attempts to push the connectors apart. The connectors can then be disengaged when the retention force is overcome by, for example, pulling the connectors apart. In other embodiments, other types of mechanical latches or magnetic latches can be used.

Figure 5:
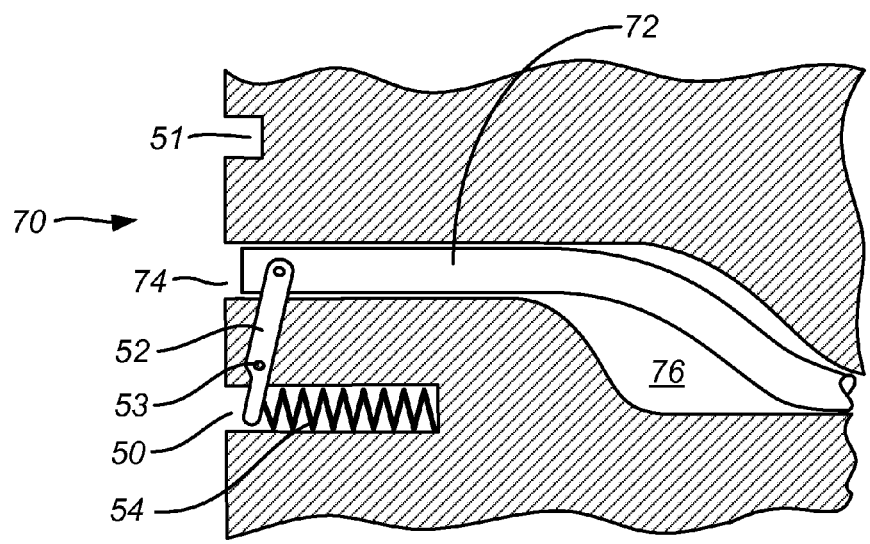
FIG. 5 is a simplified cross-sectional view of a portion of an optical connector 70 according to another embodiment of the invention.

FIG. 5 is a simplified cross-sectional view of a portion of an optical connector 70 according to another embodiment of the invention. Connector 70 is similar to connector 40 except that it does not include a lens 46. Instead, lever 52 is operatively coupled to an optical fiber 72 or, in another embodiment, a ferrule (not shown) coupled to the end of fiber 72. Spring 54 biases the lever so that a distal end 74 of fiber 72 is within cavity 44 when the connector is not mated to a corresponding male connector. Cylindrical cavity 44 opens into a larger cavity 76. A portion of fiber 72 is bent within the larger cavity by an amount that is less than the maximum bend radius of the fiber so that the bend does not interfere with the transmission of optical signals along the fiber. When a force is applied to the end of lever 52 that overcomes the bias supplied by spring 54, lever 52 pivots around fulcrum 53 extending the end of fiber 72 out of cavity 44, which in turn, reduces the bend of fiber 72 within cavity 76. Thus, cavity 44 and the end of fiber 72 can be cleaned when an injector tool 35 is inserted in cavity 50 or fiber 72 can be communicatively coupled to another fiber when a corresponding plug connector, similar to connector 60, is mated with connector jack 70.

Figure 6:
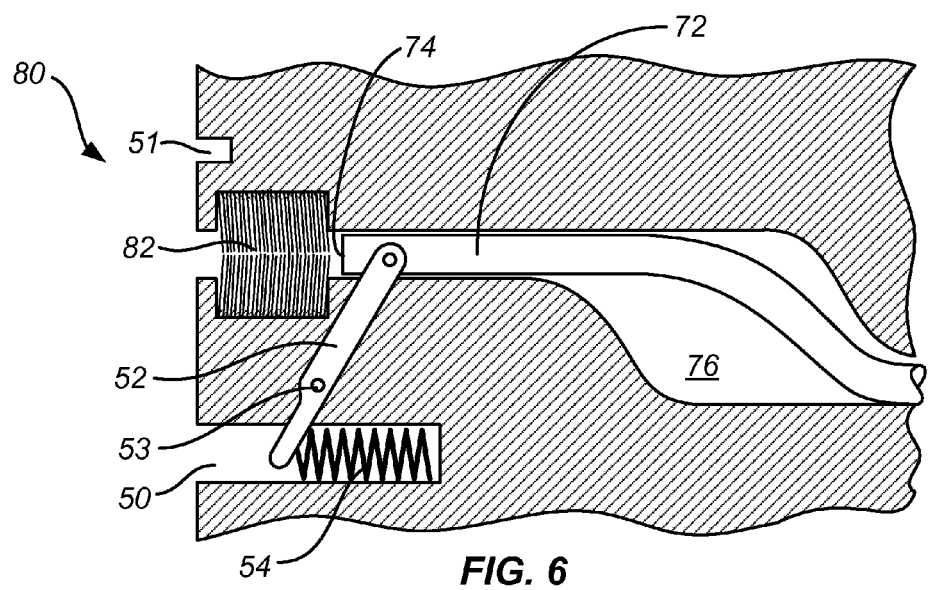
FIG. 6 is a simplified cross-sectional view of a portion of an optical connector 80 according to still another embodiment of the invention.

FIG. 6 is a simplified cross-sectional view of a portion of an optical connector 80 according to still another embodiment of the invention. Connector 80 is similar to connector 70 except that it includes a fiber/lens cleaning system 82. In one embodiment, cleaning system 82 includes soft brushes that extend from an interior perimeter wall towards a longitudinal center point of cavity 82. The brushes help keep dirt and debris out of the lens cavity in the first place. Additionally, each time lever 52 is activated to extend fiber 72 out of its cavity, the fiber passes through brush bristles to remove dirt and debris that may have collected on the end 74 of fiber 72. In other embodiments, cleaning system 82 includes soft rubber wipes, a diaphragm or similar mechanisms in addition to or instead of brush bristles that brush across and self-clean fiber end 74 as the fiber is extended out of its cavity.

Figure 7:
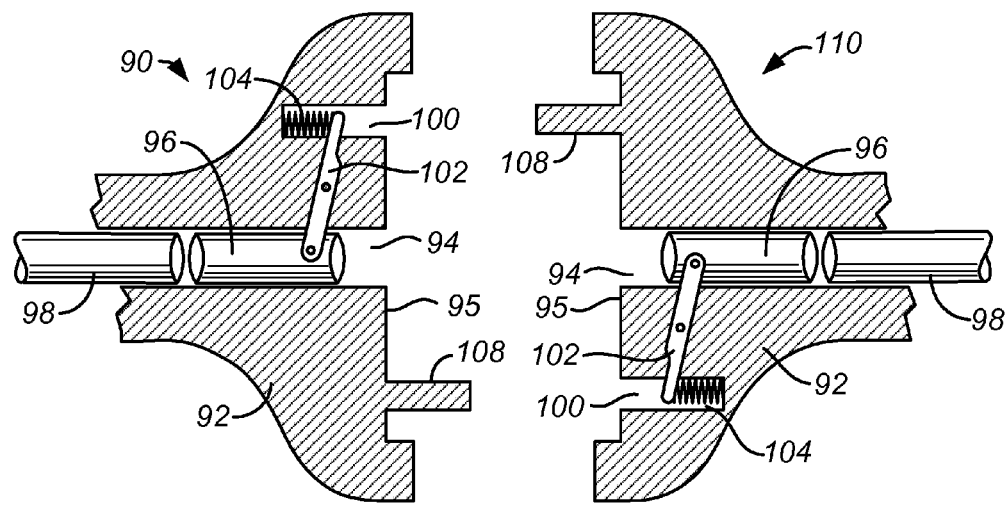
FIG. 7 is a simplified cross-sectional view of two optical connectors 90 and 110 according to another embodiment of the invention.

FIG. 7 is a simplified cross-sectional view of a portion of an optical connector system that includes mating connectors 90 and 110 according to another embodiment of the invention. Connector 90 includes a body 92 having a lens cavity or central bore 94 and lever cavity 100 formed therein. A lens 96 and optical fiber 98 are situated within lens cavity 94. Connector 90 also includes a lever 102 that has one end which extends into cavity 100 and a second end coupled to lens 96. A spring 104 biases the lever so that lens 96 is withdrawn into cavity 100 when the connector is not in use. Connector 110 can be identical to connector 90 and thus includes similar components which are labeled with the same reference numbers for convenience.

Each of connectors 90 and 110 includes an engagement projection 108 on the opposite side of the connector as lever cavity 100. Connectors 90 and 110 can be mated when they are aligned such that engagement projection 108 of connector 90 is positioned opposite lever cavity 100 of connector 110. When the connectors are so arranged, the engagement projection 108 of connector 110 is correspondingly positioned opposite lever cavity 100 of connector 90. When the engagement projections are inserted into the respective lever cavities, each activates the lever 102 of the other connector extending lenses 96 towards each other out of cavities 100 and beyond surfaces 95 so that the lenses are communicatively coupled together to allow optical signals to transmit from one lens 96 to the other. In one embodiment, lenses 96 are physically pressed against each other when the connectors are mated. In another embodiment, the lenses are spaced apart by a predetermined distance that is sufficiently small to allow optical signal streams to be passed between the connectors. Some embodiments include mechanical or magnetic retention mechanisms (e.g., notches on projections 108 and detents within cavities 100) to secure the connectors together as described above with respect to FIG. 4.

As will be understood by those skilled in the art, the present invention may be embodied in other specific forms without departing from the essential characteristics thereof. For example, while embodiments of the invention were discussed above with respect to an connector system having a single optical fiber, other embodiments of optical connectors according to the invention may include multiple fibers and multiple corresponding lenses each of which can be positioned within and ejected beyond a respective cavity as described above. Also, some embodiments of connectors according to the present invention may include electrical contacts in addition to optical fibers.

As another example, while embodiments of the invention have been described above as having a mechanical lever and spring to eject an optical component from a recessed position, the invention is not limited to any particular ejector system and a variety of other mechanical and/or magnetic ejectors can be employed instead. As one example, in one embodiment end 32a of lever 32 extends outside cavity 50 beyond surface 45. A tool or mating connector can then push end 32a flush with surface 45 or within cavity 50 to extend the optical component. As another example, the lever can be made out of a magnetic material and activated to eject the optical component when an opposite polarity magnet (e.g., magnetic tool or a magnetized projection on a mating connector) is inserted into the lever cavity. Additionally, instead of having a lever or other type of ejector that extends a lens or other optical component out of a connector, some embodiments of the invention, the lens is very close to the outer surface of the connector and is covered by a mechanical door. When an insertion tool or projection from a mating connector is inserted into a cavity similar to one of the cavities that houses the lever, the mechanical door is opened to expose the lens thus enabling it to be optically coupled to a lens or optical fiber in a mating connector. Those skilled in the art will recognize, or be able to ascertain using no more than routine experimentation, other equivalents to the specific embodiments of the invention described herein. Such equivalents are intended to be encompassed by the following claims.

What is claimed is:

1. An optical connector comprising:
a body having an outer surface;
a first cavity extending within the body from the outer surface;
an optical component positioned within the first cavity;
an ejector coupled to the optical component;
a biasing mechanism operatively coupled to apply a biasing force to the ejector to secure the optical component within the first cavity, wherein when a force is applied to the ejector to overcome the biasing force, the ejector ejects the optical component from the first cavity so that it extends beyond the outer surface.

2. The optical connector of claim 1 wherein the optical component comprises a lens and the optical connector further comprises an optical fiber optically coupled to the lens.

3. The optical connector of claim 1 wherein the optical component comprises an optical fiber.

4. The optical connector of claim 1 wherein the ejector comprises a lever and the biasing mechanism comprises a spring positioned between an end wall of the second cavity and the lever.

5. The optical connector of claim 1 wherein the first cavity includes a cleaning element positioned within a cut-out between the optical component and outer surface and a bore, concentric with the cut-out, that extends from the outer surface through the cut-out.

6. The optical connector of claim 1 further comprising a second cavity spaced apart from the first cavity, the second cavity extending within the body from the outer surface, wherein the ejector includes a first end that extends into the second cavity and wherein the ejector ejects the optical component from the first cavity when a force greater than the biasing force is applied to the first end of the ejector within the second cavity.

7. An optical jack comprising:
a body having a front external surface and first and second cavities extending from the first surface into the body;
an optical component positioned within the first cavity; and
a lever having a first end coupled to the optical component, a second end extending into the second cavity and a pivot point between the first and second ends, wherein the lever is biased to secure the optical component within the first cavity and, wherein when a force is applied to the second end of the lever to overcome the bias, the lever extends at least a portion of the optical component out of the cavity beyond the front surface of the body.

8. The optical jack set forth in claim 7 wherein the optical component comprises a lens and the optical jack further comprises an optical fiber optically coupled to the lens.

9. The optical jack set forth in claim 7 wherein the optical component comprises an optical fiber.

10. The optical jack set forth in claim 7 wherein the first and second cavities comprise parallel bores and the cross-section of the first cavity is slightly larger than the cross-section of the optical component.

11. The optical jack set forth in claim 7 further comprising a cleaning element positioned within the first cavity between the optical component and external surface; wherein the optical component passes through the cleaning element when it is extended out of the cavity by the lever.

12. The optical jack set forth in claim 11 wherein the cleaning element comprises brush bristles that extend from an interior surface of the first cavity towards a longitudinal central axis.

13. The optical jack set forth in claim 7 further comprising a retention mechanism adapted to secure a corresponding mated plug connector with a retention force that is greater than a force applied by the spring to bias the lever.

14. The optical jack set forth in claim 9 wherein the first cavity includes a bore that opens to a larger cavity in which the optical fiber is bent less than a maximum bend radius of the fiber; and wherein when the optical component is extended out of the first cavity the bend in the optical fiber is reduced.

15. An optical jack comprising:
a body having a front external surface and first and second cavities extending from the first surface into the body;
an optical fiber positioned in the first cavity;
a lens positioned within the first cavity, the lens optically coupled to the optical fiber; and
a lever having a first end coupled to the lens, a second end extending into the second cavity and a pivot point between the first and second ends, wherein the lever is biased by a spring positioned in the second cavity between an end of the second cavity and the second end of the lever to secure the lens within the first cavity and, wherein when a force is applied to the second end of the lever to overcome the bias, the lever extends at least a portion of the lens out of the cavity beyond the front surface of the body.

16. The optical jack of claim 7 wherein the first cavity has a cylindrical bore extending from the first surface of the body to a depth D and wherein the lens and a first end of the optical fiber are positioned within the cylindrical bore such that the first end is spaced apart from the optical fiber by an optical gap.

17. The optical jack of claim 9 wherein an interior surface of the cylindrical portion in the optical gap is coated with a reflective coating.

18. An electronic device comprising:
a housing;
an electronic component within the housing; and
an optical jack communicatively coupled to the electronic component, the optical jack including:
a body having a front external surface and first and second cavities extending from the first surface into the body;
an optical component positioned within the first cavity; and
a lever having a first end coupled to the optical component, a second end extending into the second cavity and a pivot point between the first and second ends, wherein the lever is biased to secure the optical component within the first cavity and, wherein when a force is applied to the second end of the lever to overcome the bias, the lever extends at least a portion of the optical component out of the cavity beyond the front surface of the body.

19. The electronic device of claim 18 wherein the optical component comprises a lens and the optical jack further comprises an optical fiber optically coupled to the lens.

20. The electronic device of claim 18 further comprising a cleaning element positioned within the first cavity between the optical component and external surface; wherein the optical component passes through the cleaning element when it is extended out of the cavity by the lever.

* * * * *